FREQUENCY SHIFT KEYED DISCRIMINATING CIRCUITS

Filed Feb. 4, 1966

INVENTOR:
GORDON H. DANIELSON,

BY Marvin [signature] Goldenberg
HIS ATTORNEY.

United States Patent Office 3,439,283

Patented Apr. 15, 1969

3,439,283

FREQUENCY SHIFT KEYED DISCRIMINATING CIRCUITS

Gordon H. Danielson, Syracuse, N.Y., assignor to General Electric Company, a corporation of New York Filed Feb. 4, 1966, Ser. No. 525,163
Int. Cl. H03k 9/06
U.S. Cl. 329—104 10 Claims

ABSTRACT OF THE DISCLOSURE

Frequency shift keyed discriminating circuits which employ digital techniques in their construction and operation and are adaptable for microelectronic fabrication. In one embodiment the received signal $f_0 \pm \Delta f$ and a local signal of $f_0$ are applied to a serial path including an input and output multivibrator for generating a train of varying width pulses from which is derived an output square waveform corresponding to the modulations. A frequency selection is additionally provided in a second embodiment wherein the received and local signals are applied with different phase to parallel paths each including a multiplier for generating phase related pulse trains which are combined to provide a square waveform for an output multivibrator.

The invention relates to frequency shift keyed (FSK) discriminating circuits, and, more specifically, to novel circuits of this type which are highly selective and yet do not require crystal resonator components as an integral part of the circuit. Of particular importance, the disclosed circuits are readily adaptable to a microelectronic form of circuitry.

Frequency shift keyed discriminator circuits existing in the prior art which have good frequency selective characteristics, i.e., with high Q properties on the order of 100 to in excess of 1,000 normally require one or more crystal resonators in the discriminator circuitry per se. Further, in conventional systems having multiple FSK channels, the bandpass filter networks of the receiver tuning stages often employ crystals. Since crystal components are relatively large and bulky, these circuits are not adaptable to microelectronic techniques, or are adaptable to only a limited extend. Accordingly, in the current state of the art, only FSK discriminator circuits having relatively low Q properties, and which do not need to perform a signal filtering process, are capable of being fabricated entirely in a microelectronic circuit construction. Where high frequency selectivity is required, or where it is required to extract the signal to be discriminated from a band of frequencies, such as in the reception of multiple channel FSK signals, it is necessary to employ bulk components for the discriminator or filter circuit, or both.

The present invention provides two basic circuits of novel configuration which perform the aforementioned functions and yet can be readily adapted to a microelectronic circuit construction. The present circuits are constructed so that rather than require a complex crystal circuit configuration of either the discriminator circuit per se or the band-pass filter, the critical frequency requirements are transposed to a relatively simple local oscillator circuitry, normally already available for use in associated circuitry.

It is accordingly one object of the present invention to provide novel frequency shift keyed discriminating circuits which do not require crystal resonators for their composition but are yet of highly selective frequency characteristics.

It is a further object of the invention to provide novel frequency shift keyed discriminating circuits which are highly frequency selective and composed entirely of components that may be readily adapted to microelectronic fabrication techniques.

It is another object of the invention to provide novel frequency shift discriminating circuits which employ digital techniques in their construction and operation.

It is a further object of the invention to provide a novel frequency shift keyed discriminator circuit of the above noted characteristics that is responsive to a single channel signal.

It is still a further object of the invention to provide a novel frequency shift keyed discriminator circuit of the above noted characteristics that is responsive to multiple channel FSK signals, or the like, which circuit filters out a selected signal in addition to providing the discrimination function.

In accordance with these and other objects, there is provided in accordance with one embodiment of the invention a novel FSK discriminator circuit for receiving a single channel FSK signal of frequency $f_0 \pm \Delta f$, where $f_0$ is the center frequency and $\Delta f$ is the deviation frequency normally corresponding to a binary information bit of a ONE or ZERO. The informtaion is applied at a clock rate that is normally at a fraction of the deviation frequency. The circuit includes a first bistable storage means in the form of a multivibrator to which is applied the FSK input signal and a locally generated signal of frequency $f_0$ for, respectively, setting and resetting said multivibrator between two discrete output states. There is accordingly generated by the multivibrator a pulse train of varying pulse width, the variations following a generally sawtooth configuration. A low-pass filter receives the output from said multivibrator, filtering out the high frequency components so as to provide the noted sawtooth signal. The slope of said sawtooth corresponds to the deviation frequency $\pm \Delta f$. Coupled to the filter is a differentiator for providing a series of narrow pulses having a polarity corresponding to the direction of the frequency deviation. The differentiated signal is applied to a phase splitter having two outputs, one transmitting the applied signal undisturbed and the second transmitting the signal with the polarity inverted. The outputs from the phase splitter are coupled to a final multivibrator stage and act, respectively, to set and reset the output states thereof. There is thus provided at the output of the final multivibrator stage a square waveform indicative of the modulating binary information.

In accordance with a second embodiment of the invention there is provided a novel FSK discriminator circuit responsive to multichannel FSK signals which provides both filtering and discrimination of the received signal. The received FSK signal may each be represented again as $f_0 \pm \Delta f$. A pair of signal paths are included to which a multiplicity of FSK signals can be applied. The first signal path has at its input a multiplier network in which the input signals are mixed with a locally generated signal of frequency equal to the center frequency $f_0$ of the signal selected for discrimination. Following said multiplier and serially coupled in the order recited are a low-pass filter for passing only the modulating frequency components of the selected signal, means for shaping the filtered signal into a square waveform having sharp leading and lagging edges, and a differentiating network which generates a corresponding series of narrow pulses. At the input to the second signal path is a second multiplier network for mixing the applied signal with the previously referred to locally generated signal shifted in phase by an angle $\alpha$. Following the multiplier in the second path are a low-pass filter and shaping means identical to the first signal path components. There is accordingly produced at the output of the shaping network in path two a square waveform that leads or lags the square waveform at the output of the shaping network in path one by the angle $\alpha$, as a function of the sign of the deviation frequency. The signals from the shaping network in path two and the differentiating network in path one are applied to a logic gate having a pair of outputs. At a first output of said gate there is generated a signal responsive to the presence of signals of the same polarity at each of the inputs, and at a second output there is generated a signal responsive to the presence of signals of opposite polarity at each of the inputs. The outputs from the logic gate are coupled to set a bistable multivibrator stage for setting and resetting, respectively, the output states thereof. From the output of the multivibrator is thereby generated a square waveform that is in accordance with the modulated information.

While the specification concludes with claims which set forth the invention with particularity, it is believed that the invention, both as to its organization and method of operation, will be better understood from the following description taken in connection with the accompanying drawings in which:

Figure 1:
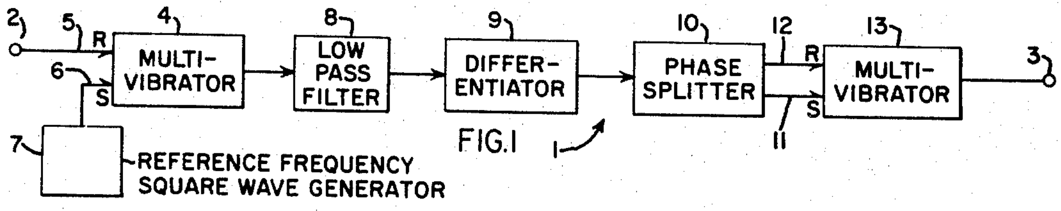
FIGURE 1 is a block diagram of a first embodiment of the invention relating to a FSK discriminator circuit for receiving single channel FSK signals.

Referring to FIGURE 1, there is illustrated in block diagram form a FSK discriminator circuit 1 to the input terminal 2 of which is applied a single channel FSK signal. The FSK signal may be expressed as $f_0 \pm \Delta f$, where $f_0$ is the center frequency of the signal and $\pm \Delta f$ is the deviation frequency representing a binary ONE or ZERO information bit, e.g., where $f_0 + \Delta f$ represents a ONE and $f_0 - \Delta f$ represents a ZERO. The information is applied at a given clock rate that is less than the deviation frequency, in one operating embodiment being one quarter the deviation frequency. In wireless FSK communication systems, the center frequency $f_0$ is normally at an intermediate frequency, the highest value of which is limited by the time response of the circuit components. It should be noted, however, that whether the FSK signal is received over a wireless or wire path is unimportant to the invention.

The circuit provides a high Q discrimination of the received input information, generating at the output terminal 3 of a square waveform representing the modulation information. The circuit is of particular advantage in providing good frequency selectivity, i.e., where the ratio $\Delta f / f_0$ may be extremely low, with the employment of circuit components that are suitable for microelectronic fabrication. In a typical operation $f_0$ may be on the order of tens of megacycles and $\Delta f$ on the order of several kilocycles.

Figures 2A, 2B, 2C, 2D, 2E, 2F, 2G, 2H, 2J, 3, 4A, 4B, 4C, 4D, 4E:
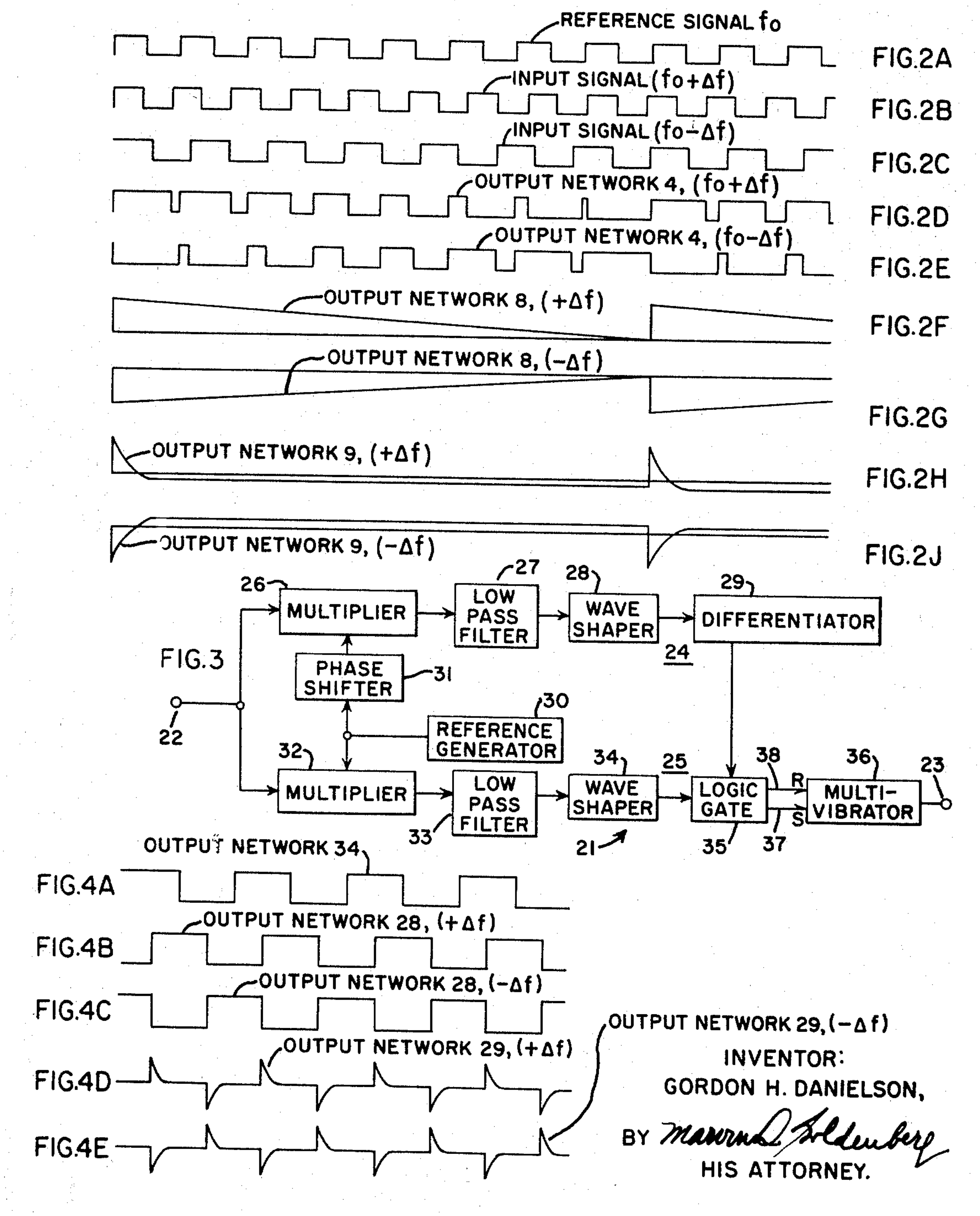
FIGURES 2A, 2B, 2C, 2D, 2E, 2F, 2G, 2H and 2J are a series of electrical waveforms used in a functional description of the circuit of FIGURE 1.
FIGURE 3 is a block diagram of the second embodiment of the invention relating to a FSK filter-discriminator circuit for receiving multiple channel FSK signals.
FIGURES 4A, 4B, 4C, 4D and 4E are several electrical waveforms employed in a functional description of the circuit of FIGURE 4.

The discriminator circuit 1 includes as a first stage thereof a bistable multivibrator network 4 having two input connections 5 and 6. The FSK input signal at the terminal 2 is coupled to connection 5 for resetting the multivibrator. Coupled to connection 6 for setting the multivibrator is a locally generated signal of frequency $f_0$, schematically illustrated as being generated by a suitable reference generator 7. The network 4 may be a conventional structure, preferably one designed for a microelectronic implementation, such as the Motorola MC 308. So as to provide a precise operation of the network 4, the reference signal is generated as a square wave and the input signal is applied as a hard limited signal to terminal 2, as generally illustrated in FIGURES 2A, 2B and 2C. In practice, the reference signal is commonly available from a local sinusoidal oscillator source already in use, it being necessary only to tap the output from said source and modify it by appropriate wave shaping circuitry as may be necessary.

At the output of network 4 there is generated a train of pulses of varying pulse width, as shown in FIGURES 2D and 2E, the pulse width being of increasing or decreasing order as a function of the modulation information. The output of multivibrator 4 is coupled to a low-pass filter 8 which rejects the high frequency components of the signal applied thereto and provides at its output a sawtooth waveform of the type illustrated in FIGURES 2F and 2G. The filter 8 is a conventional component and in one operable embodiment was comprised of a two section RC filter. Coupled to the output of the low-pass filter 8 is differentiating network 9 for deriving narrow pulses from the applied waveform, as shown in FIGURES 2H and 2J. The differentiating network is likewise a conventional component and may be simply an RC network.

The differentiating network 9 is connected to a phase splitting network 10 of standard type having a first output connection 11 for transmitting the applied waveform directly and a second output connection 12 for inverting the polarity of the applied waveform. Output connection 11 is applied to the set terminal of an output bistable multivibrator network 13, which may be identical to the input multivibrator 4, and connection 12 is coupled to the reset terminal of network 13. The output of network 13 is connected to output terminal 3.

Describing now the operation of the circuit of FIGURE 1, the input multivibrator network 4 is excited at its set terminal by the positive going transitions of the square wave of frequency $f_0$ generated by the source 7 so as to generate a positive level output voltage. It is excited at its reset terminal by the positive going transitions of the input square wave of frequency $f_0 \pm \Delta f$ to generate a negative level output voltage. Square waves of frequency $f_0$, $f_0 + \Delta f$ and $f_0 - \Delta f$ are shown in FIGURES 2A, 2B and 2C, respectively. For a frequency deviation of $+\Delta f$, there is produced at the output of the multivibrator network 4 a pulse waveform as shown in FIGURE 2D. The duty cycle of the positive pulses of the pulse train decreases in a sawtooth manner. For a frequency deviation of $-\Delta f$, there is produced at the output of network 4 a pulse train having a duty cycle which increases in a sawtooth manner, as shown in FIGURE 2E. The low-pass filter network 8 in rejecting the high frequency components of the waveforms of FIGURES 2D and 2E provides outputs of the deviation frequency components, which appear as shown in FIGURES 2F and 2G, respectively. The sawtooth output waveforms from the filter network 8 are then differentiated by network 9 so as to provide a series of positive polarity narrow pulses for a $+\Delta f$ deviation, shown in FIGURE 2H, and a series of negative polarity narrow pulses for a $-\Delta f$ deviation, shown in FIGURE 2J.

The differentiated narrow pulses are coupled through the phase splitting network 10 so as to be coupled with its original polarity to the set terminal of multivibrator network 13, and with an inverse polarity to the reset terminal of network 13. The network 13 is excited at its set and reset terminals by only positive going transitions of applied voltages, excitation at the set terminal generating a positive level output voltage and excitation of the reset terminal generating a negative level output voltage. It may be appreciated that for a given polarity of pulses applied to the phase splitter 10, only one of the input terminals of network 13 will be excited in accordance with said polarity.

If it is assumed that a $f_0 + \Delta f$ FSK signal is indicative of a binary ONE and that such signal is applied to network 4, a pulse train of decreasing duty cycle is generated, shown in FIGURE 2D, which upon filtering and differentiation provides narrow pulses of positive polarity, shown in FIGURE 2H. The positive pulses are applied directly to the set terminal of network 13 and are applied in inverted fashion as negative pulses to the reset terminal. Since network 13 responds only to rapid positive transitions, the output is set to a positive level voltage which represents a binary ONE information bit. Conversely, with an FSK input signal of $f_o-\Delta f$ indicative of a binary ZERO, a series of narrow negative pulses are derived and applied to the phase splitter 10, with the negative pulses being directly coupled to the set terminal of network 13 and coupled in inverted fashion to the reset terminal as positive pulses. Accordingly, the reset terminal is now excited and acts to switch the output to its negative voltage level, indicative of the ZERO information bit.

It may be appreciated that a number of operating principles other than those specifically adverted to may be incorporated in the design of the circuit for providing a consistent representation of binary ONES and ZEROS. For example, the set and reset connections to the multivibrator networks can be readily reversed. Further, the voltage levels indicating the binary information can be opposite from that described above. Further, in the description of the multivibrator operation it has been assumed that these networks respond to positive going transitions of the applied voltage at the set and reset terminals. This form of operation is well known to be provided by a capacitive coupling. The operation provides an output of two discrete voltage levels as long as the transitions do not overlap, which permits a relatively simple functional description of the circuit. However, for some operating conditions, and particularly with respect to the first multivibrator network 4, the period between set and reset may be shorter than the response time of the multivibrator network. For such conditions it is desirable to provide a direct coupling to the input terminals of the multivibrator network whereby the network responds to voltage magnitudes at the input terminals, rather than voltage transitions. For such a condition the output may no longer consist of two discrete levels but rather corresponds to three levels, the third being an intermediate level which obtains in response to the concurrent application of inputs. Nevertheless, the derived waveforms still contain a low frequency component which varies in a sawtooth manner and the circuit operation is essentially the same as described.

With reference now to the FSK filter-discriminator circuit 21, shown in block diagram form in FIGURE 3, there is provided a circuit which performs both a discriminating and filtering function. Thus, to the input terminal 22 of the illustrated circuit there is normally applied multiple channel FSK signals, the signal of each channel being generally expressed as $f_o\pm\Delta f$, where $f_o$ is now the center frequency of a given channel. The circuit filters out a selected FSK input signal from the multiplicity of signal channels, and provides a high Q discrimination of the filtered information. As with respect to the embodiment of FIGURE 1, the circuit generates at the output terminal 23 a square waveform representing the modulation information.

The filter-discriminator circuit 21 includes a first signal path 24 and a second signal path 25 in parallel with the first from which the output is derived. The first path includes serially connected in the order recited a multiplier network 26, a low-pass filter network 27, a wave shaping network 28 and a differentiating network 29. Each network in itself can be of conventional design. The signal from a local reference frequency generating source 30 is connected through a phase shifting network 31 to multiplier network 26. Phase shifting network 31 provides a constant phase shift of $\alpha$ degrees which angle must be sufficiently large to provide the requisite discrimination between $+\Delta f$ and $-\Delta f$ deviations, as will be explained in greater detail presently. In a typical operation $\alpha$ is set within 45° to either side of quadrature.

As with respect to the embodiment of FIGURE 1, the locally generated reference signal may be derived from an already available local oscillator source. The multiplier 26 generates, in a conventional manner, product components of the two applied signals. For example, it can be a nonlinear mixer of the type which includes nonlinear or variable gain elements. In one operating embodiment of the circuit, the multiplier 26 was a semiconductor diode switch driven by the signal from reference frequency generator 30, both composed of digital circuitry suitable for a microelectronic fabrication. Filter 27 and differentiator 29 may be simple RC networks. The network 28 may be typically a Schmitt trigger circuit.

Path 25 includes serially connected in the order recited a second multiplier network 32, low-pass filter 33 and wave shaping network 34. In addition, there is serially coupled at the output of network 34 a logic gate 35 and a bistable multivibrator network 36. The signal from source 30 is connected directly to the mixer network 32. Components 32, 33 and 34 are similar to the corresponding components in path 24 and multivibrator network 36 is similar to those employed in the circuit of FIGURE 1. Logic gate network 35, to which are coupled both the wave shaping network 34 and the differentiating network 29 is of the type providing a pair of outputs, one of which is generated in response to the presence of applied signals of the same polarity and the second of which is generated in response to the presence of applied signals of opposite polarity. A first output connection 37 sets the multivibrator network 36, and a second output connection 38 resets network 36. The output from network 36 is coupled to output terminal 23.

In the operation of the circuit of FIGURE 3, a plurality of FSK signals may be simultaneously applied to multiplier networks 26 and 32 wherein the signals are multiplied with a locally generated signal so as to provide numerous product components, in the conventional manner, at the outputs of said networks. The output from each of networks 26 and 32 are passed through low-pass filters 27 and 33, respectively, which are designed to reject the high frequency components and pass only a single band of deviation frequency components, corresponding to the selected channel. It may be appreciated that channel selection is provided by setting the reference signal frequency to the center frequency of the channel to be discriminated. All other received signals will produce at the outputs of the multiplier networks modulation components which are not within the pass band of the low-pass filters. The filtered waveforms, which at this point in the paths 24 and 25 are of a sinusoidal configuration, are shaped by wave shaping networks 28 and 34 so as to approximate a square wave.

It has been noted that the local signal is phase shifted by a fixed angle $\alpha$ prior to mixing with the input signal to network 26. This is performed so that the deviation frequency demodulation components at the outputs of networks 28 and 34 have a phase relationship that is a function of the sign of the deviation frequency. Accordingly, for a $+\Delta f$ frequency deviation, the square wave at the output of network 28, shown in FIGURE 4B, lags by the angle $\alpha$ the square wave of the output of wave shaping network 34, shown in FIGURE 4A. For a $-\Delta f$ frequency deviation, the square wave at the output of network 28, shown in FIGURE 4C, leads by the angle $\alpha$ the square wave at the output of network 34.

The square wave generated by network 28 is differentiated in network 29 so as to produce a series of bipolar narrow pulses corresponding to the leading and lagging edges of the square wave. For frequency deviations of $+\Delta f$ and $-\Delta f$, the differentiated pulses appear as in FIGURES 4D and 4E, respectively. The differentiated pulses are applied to logic gate 35 in combination with the square wave from wave shaping network 34. For the condition in which both inputs to logic gate 35 are of the same polarity, the output connection 37 is energized for setting the multivibrator to a first level output voltage.

For the condition in which the inputs to the logic gate are of opposite polarity, output connection 38 is energized so as to switch multivibrator network 36 to a second level output voltage. In this manner, there is generated at output terminal 23 a square wave having a voltage level corresponding to the modulation information of the FSK signal. It may be appreciated that the angle $\alpha$ must be as close to quadrature as necessary for there to be provided a sufficiently accurate time alignment between the waveforms applied to logic gate 35 for the gate to distinguish between inputs of like and unlike polarity.

In addition to those already discussed, a number of modifications could be made to the circuits of FIGURES 1 and 3 which would not alter the basic circuit configurations and operations. For example, and in general, another form of bistable storage means such as a tunnel diode network could be used in both embodiments in lieu of the disclosed multivibrator networks. More specifically, the differentiating operation in FIGURE 1 might be performed after the phase splitting. Further, in FIGURE 3 the differentiating network 29 could be inserted in the second signal path following network 34, in lieu of its present location, and the phase shifter 31, alternatively, could be coupled between generator 30 and mixer 32.

What I claim as new and desire to secure by Letters Patent of the United States is:

1. A discriminating circuit for discriminating frequency shift keyed signals $f_0 \pm \Delta f$, where $f_0$ is the center frequency and $\pm \Delta f$ the frequency deviations, comprising:

(a) first means including bistable storage means responsive to said frequency shift keyed signals and a further signal at the frequency $f_0$ for producing a series of varying width pulses having a width variation sequence as a function of the direction of said frequency deviations, and (b) second means responsive to the output of said first means for generating an output waveform having amplitude variations which correspond to said width variation sequence.

2. A discriminating circuit as in claim 1 wherein said variable width pulses have a repetition rate on the order of the center frequency $f_0$ and said second means includes further means for transforming said variable width pulses into a series of further pulses having a repetition rate on the order of the deviation frequency $\Delta f$ and having amplitude characteristics that are a function of the direction of said frequency deviations.

3. A discriminating circuit as in claim 2 wherein said second means further includes a second bistable storage means responsive to said further pulses for generating said output waveform.

4. A discriminating circuit as in claim 3 wherein said further means includes a low-pass filter network coupled to said first bistable storage means for passing the lower frequency components of the output from said bistable means and a differentiating network coupled to said filter network for forming said series of further pulses as narrow width pulses having a polarity in accordance with the direction of said frequency deviations.

5. A discriminating circuit as in claim 4 wherein said second bistable storage means has set and reset terminals which respond to trigger signals of but a single polarity and said second means further includes phase splitting means for applying said narrow width pulses to said set and reset terminals with opposing polarities whereby there is generated an output waveform of a first amplitude level in response to $+\Delta f$ frequency deviations and a second amplitude level in response to $-\Delta f$ frequency deviations.

6. A discriminating circuit as in claim 5 wherein said first and second bistable storage means are multivibrator networks.

7. A discriminating circuit for discriminating frequency shift keyed signals $f_0 \pm \Delta f$ extractable from a spectrum of frequencies, where $f_0$ is the center frequency and $\pm \Delta f$ the frequency deviations, comprising:

(a) multiplying means responsive to said frequency shift keyed signals and a further signal at the frequency $f_0$ for producing first and second waveforms having one of two discrete phase relationships with respect to each other as a function of said frequency deviations, (b) means responsive to said first and second waveforms for generating a first control signal for a first phase relationship and a second control signal for a second phase relationship, and (c) bistable means responsive to said first and second control signals for generating an output waveform having amplitude variations which correspond to said two discrete phase relationships.

8. A discriminating circuit for discriminating frequency shift keyed signals $f_0 \pm \Delta f$ extractable from a spectrum of frequencies, where $f_0$ is the center frequency and $\pm \Delta f$ the frequency deviations, comprising:

(a) first and second signal paths coupled in parallel and each including a multiplying means, (b) means for coupling said frequency shift keyed signals to said multiplying means, (c) means for coupling a further signal at the frequency $f_0$ directly to one of said multiplying means and with a phase shift $\alpha$ to the other of said multiplying means so as to produce within said signal paths a first and second series of pulses shifted in phase with respect to each other by the angle $\alpha$ as a function of the direction of said frequency deviations, (d) logic means responsive to the outputs from said first and second signal paths for generating a first trigger signal for a leading phase relationship of said outputs relative to one another and for generating a second trigger signal for a lagging phase relationship of said outputs, and (e) bistable storage means responsive to said first and second trigger signals for generating an output waveform having amplitude variations which correspond to said two discrete phase relationships.

9. A discriminating circuit as in claim 8 wherein said first and second signal paths each include wave shaping means for steepening the leading and lagging edges of the pulses generated within said paths, and one of said signals paths including a differentiating means coupled to that path's wave shaping means for generating a series of bipolar pulses, the polarity of which is either equal or opposite to the polarity of the pulses generated within the other signal path.

10. A discriminating circuit as in claim 9 wherein said bistable storage means is a multivibrator network.

References Cited

UNITED STATES PATENTS

| | | | |
|---|---|---|---|
| 2,904,683 | 9/1959 | Meyer | 329—104 X |
| 3,035,231 | 5/1962 | Neelands et al. | 329—12 X |
| 3,238,299 | 3/1966 | Lender | 178—66 X |
| 3,263,185 | 7/1966 | Lender. | |
| 3,323,061 | 5/1967 | Davis | 325—30 |

ALFRED M. BRODY, *Primary Examiner.*

U.S. Cl. X.R.

329—1, 105, 50; 328—58, 111, 118; 325—320, 30; 178—66